United States Patent [19]

Nishii et al.

[11] Patent Number: 4,801,442

[45] Date of Patent: Jan. 31, 1989

[54] METHOD FOR PURIFYING STARTING MATERIALS FOR FABRICATING CHALCHOGENIDE GLASS

[75] Inventors: Junji Nishii; Takashi Yamagishi, both of Osaka, Japan

[73] Assignee: Nippon Sheet Glass Co., Ltd., Japan

[21] Appl. No.: 40,186

[22] Filed: Apr. 17, 1987

[30] Foreign Application Priority Data

Apr. 18, 1986 [JP] Japan ................................. 61-89260

[51] Int. Cl.$^4$ ............................................. C01B 19/02
[52] U.S. Cl. ...................................... 423/510; 423/111; 423/155; 423/508; 423/625; 423/635
[58] Field of Search ............... 423/508, 510, 625, 635, 423/578 R, 123, 159; 202/164

[56] References Cited

U.S. PATENT DOCUMENTS

| | | | |
|---|---|---|---|
| 2,409,835 | 10/1946 | Clark et al. | 423/510 |
| 2,860,954 | 11/1958 | Bueker et al. | 423/510 |
| 4,339,302 | 7/1982 | Faktor et al. | 156/DIG. 70 |
| 4,484,945 | 11/1984 | Badesha et al. | 423/508 |
| 4,548,800 | 10/1985 | Badesha et al. | 423/508 |
| 4,663,141 | 5/1987 | Sonoda et al. | 423/508 |
| 4,690,725 | 9/1987 | Bult et al. | 156/617 R |

FOREIGN PATENT DOCUMENTS

| | | | |
|---|---|---|---|
| 1178027 | 11/1984 | Canada | 423/508 |
| 0268653 | 12/1981 | U.S.S.R. | 923/508 |
| 0661882 | 11/1951 | United Kingdom | 423/510 |

OTHER PUBLICATIONS

Katsuyama et al., "Low loss Ge–Se chalcogenide glass optical fibers" Appl. Phys. Letter 45 (9), (Nov. 1, 1984), pp. 925–927.

Maruno et al., "Infrared Absorption Spectra of Glasses in the System Ge–Se–Te and Oxygen Impurity Bands", Asahi Glass Industrial Technology Promotion Association Research Report, vol. 35 (1979), pp. 367–385.

Bordas et al., "Glass–Forming Ability in the Ge–Sb–Te–Se Quaternary System", Thermochimica Acta, 28 (1979), pp. 387–393.

Hilton et al., "Infrared Absorption of Some High-–Purity Chalcogenide Glasses", Journal of Non-Crystalline Solids, 17 (1975), pp. 319–338.

*Primary Examiner*—Anthony McFarlane
*Attorney, Agent, or Firm*—Scherlacher, Mok & Roth

[57] ABSTRACT

A method for purifying starting materials for chalcogenide glass is disclosed, which comprises contacting chalcogen starting materials at a high temperature with a metal which is more susceptible to oxidation than the chalcogen starting materials to allow the metal to react with oxygen contained as impurity in the chalcogen starting material to form an oxide of the metal, and then removing the metal and the oxide of the metal from the chalcogen starting materials.

12 Claims, 1 Drawing Sheet

METHOD FOR PURIFYING STARTING MATERIALS FOR FABRICATING CHALCHOGENIDE GLASS

BACKGROUND OF THE INVENTION

The present invention relates to a method of purifying starting materials for fabricating chalcogenide glass suitable for manufacturing optical fibers having excellent infrared transmittance and weatherability.

Chalcogenide glass is well known as a material available for transmitting infrared radiation and further is excellent in weatherability and heat resistance. Especially, chalcogenide glass is considered to be promising material for manufacturing so-called infrared fibers such as an energy propagation path for $CO_2$ laser beam (wavelength: 10.6 $\mu$m) and a waveguide for a radiation pyrometer, etc.

Heretofore, there have been known various chalcogenide glass compositions, which are capable of transmitting infrared rays of wavelength not shorter than 10.6 $\mu$m as well as being excellent in heat resistance and weatherability, which compositions comprises Ge-Sb-Se (T. Katsuyma, et al., Appl. Phys. Letter, 45, (1984) 925), Ge-Se-Te-Sb (Maruno and Noda, Asahi Glass Industrial Technology Promotion Association Research Report, 35, (1979) 367), Ge-Se-Te-Sb (S. Bordas, et al., Thermo Chimica Acta, 28, (1970) 387), etc.

However, these glass compositions have a problem that absorption occurs at a wavelength in the vicinity of 12.5 $\mu$m which is ascribable to expansion and contraction vibration or oscillation of Ge atom as constituent element and O atom contained as impurity, resulting in that optical characteristis could not be improved. This is because molar absorptivity of this absorption in the glass is high. Further, even if the glass contains a very small amount of oxygen (several ppm), the absorption is clearly confirmed in the glass. In addition, the foot of its absorption curve extends over a wavelength region shorter than 10 $\mu$m, thus disadvantageously causing transmission loss when the glass is used for manufacturing optical fibers.

It has been proposed to add Al to Ge and then melt Ge-Sb-Se or Ge-As-Se glass to reduce absorption due to oxygen impurities (A. R. Hilton, et al., J. Non-Cryst. Solids, 17, 319–338 (1975)). This method does not involve distillation of the starting materials. Further, Hilton et al. reported that use of Mg instead of Al failed to give rise to similar effects. Although oxygen-gathering effect of Al is utilized in the fabricatin of Ge-Sb-Se glass (Appl. Phys. Lett. supra) Al is added to the glass composition containing Ge and no distillation of starting materials themselves is carried out.

In view of increasing demand for higher performance of optical fibers using the chalcogenide glass, further improvements in the method of purifying starting materials for producing chalcogenide glass have been desired.

SUMMARY OF THE INVENTION

An object of the present invention is to obviate the above-described drawbacks of the conventional chalcogenide glass compositions.

Another object of the present invention is to provide a method for purifying starting materials for producing chalcogenide glgass which has excellent infrared transmittance by reducing the absorption due to oxygen contaminant.

As a result of extensive investigation with view to overcoming the above-described disadvantages, it has now been found that oxygen contained as impurity in a glass composition can be removed by contacting molten chalcogen starting material at a high temperature with a metal more susceptible to oxidation than the chalcogen starting material. The present invention is based on this finding.

Therefore, the present invention provides a method for purifying starting materials of chalcogenide glass, comprising the steps of: contacting chalcogenide starting material at a high temperature with a metal which is more susceptible to oxidation than the chalcogen starting materials to allow the metal to react with oxygen contained as impurity in the chalcogen starting material to form an oxide of the metal, and then removing the metal and the oxide of the metal from the chalcogen starting materials.

DETAILED DESCRIPTION OF THE INVENTION

Figure 1:
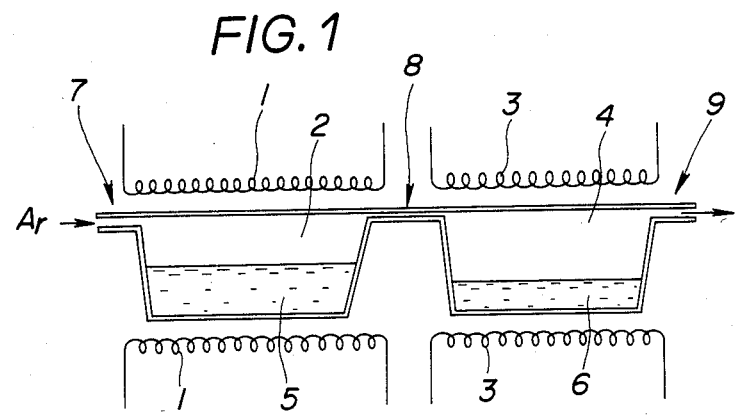
FIG. 1 is a schematical cross-sectional view of the distillation purifier used in the method of the present invention.

Hereinafter, the present invention will be described in detail with reference to the accompanying drawings.

According to the present invention, the metal to be contacted with the molten chalcogen starting material must have a reaction energy involved in the oxidation reaction, i.e., a standard free energy of formation ($-\Delta G$), higher than that of the chalcogen starting material.

Examples of particularly useful for preparing chalcogen starting material include Se and Te.

As for the metal to be contacted with the chalcogen starting material, for example, in the form of a solid solution, there can be cited Al and Mg. In particular, Mg is useful since it has an absorption due to Mg-O oscillation in a longer wavelength region as long as 18 $\mu$m and gives a minimal influence on the absorption if it remains in the glass. When the metal is contacted with the starting material, it is preferred to introduce both of them in a quartz ampule, seal the ampule at a reduced pressure, e.g., $10^{-5}$ Torr or less and heat the ampule until the contents are molten uniformly to form a solid solution of the metal in the chalcogen starting material. This is because the starting material, especially in the case of Se or Te, will evaporate before the formation of a sufficient uniform solid solution by the starting material and the metal when the starting material and the metal are heated under atmospheric pressure.

The amount of the metal to be added into the starting material depends on the amount of oxygen contained in the starting material as impurity, and usually it is preferred to use from about 1 to about 1,000 ppm. If the amount of the metal to be added is less than about 1 ppm, it is sometimes the case that oxygen impurity is not removed completely. On the other hand, if that amount is more than about 1,000 ppm, the inner wall of the quartz ampule enveloping the starting material and the metal therein may be disadvantageously corroded by the metal upon heat-melting, thus giving rise to a possibility that the purity of the starting material is deteriorated contrary to the expectation. Further, in that case, upon removal of unreacted metal from the starting material by a purifying method such as the distillation method described hereinbelow, the operation must sometimes be repeated several times.

As for the method for removing remainders of the metal and metal oxides which are reaction products between the metal and oxygen contained in the chalcogen starting material from the chalcogen starting material, conventional purification methods such as a distillation purification method, a zone refining method, etc., can be used appropriately for that purpose. Among them, the distillation purficiation method can be preferably employed for that purpose since it can give rise to a purified product or distillate of a relatively high purity with ease and quickly. Particularly preferred is to repeat the distillation operation several times.

The temperature at which the distillation operation is carried out depends on the melting point and vapor pressure of each starting material. For example, the distillation temperature is preferably in the range of from 650° to 900° C. when the starting material is Se and from 750° to 950° C. when Te is used as a starting material. If the distillation temperature is lower than the lower limit of the above-described temperature range, it takes a long time for completion of distillation since at such temperature the distillation rate is low. On the contrary, if the distillation temperature is higher than the upper limit of the above-mentioned temperature range it is sometimes the case that the distillation rate is so high that the metal to be removed can contaminate the distillate, resulting in that sufficient purification is not obtained.

Hereinafter, the present invention will be explained in greater detail with reference to examples and comparative examples. However, the present invention should not be construed as being limited to these examples.

EXAMPLE 1

An ingot of Te of a purity of 6N and that of Se of the same purity, each together with 100 ppm of Al, were introduced in separate quartz ampules, which then were sealed under reduced pressure of $10^{-5}$ Torr for encapsulation. The ampules were placed in a cradle type electric furnace and heated at 850° C. in the case of Te and 750° C. in the case of Se for 12 hours for melting to obtain solid solutions of Te-Al and Se-Al, respectively. Each of the solid solutions thus obtained was introduced in the left chamber 2 made of quartz of a distillation purifying apparatus as shown in FIG. 1 followed by purging the chamber 2 sufficiently with dry argon gas introduced thereinto from an inlet conduit 7. Thereafter, the temperatures of the left chamber 2 and the right chamber 4 were elevated to 850° C. and 550° C., respectively, in the case of Te, or to 700° C. and 330° C., respectively, in the case of Se, to sufficiently melt each solid solution and vaporize each chalcogen therefrom in the left chamber 2 and condense it in the right chamber 4 according to a distillation operation. In the left chamber 2 after the above distillation operation, there remained powders of pale yellowish white color in the case of Te or powders of pale orange color in the case of Se. Upon analysis on the residues using an X ray microanalyzer (XMA), strong X ray characteristic to Al was detected for both of the residues and it was confirmed that the concentration ratio of Te or Se to Al was about 1:4, thus indicating that the main component of the residue is Al.

The Te and Se thus obtained and ingots of Ge and Tl each of a purity of 6N were compounded so as to give a starting material, Ge-Se-Te-Tl, for producing a glass whose composition is 24 at % of Ge, 16 at % of Se, 50 at % of Te and 10 at % of Tl. The starting material was introduced in a quartz container of 13 mm in inner diameter and 100 mm in length, which was evacuated at a pressure of $10^{-5}$ Torr for 4 hours. Then the outlet of the air was sealed with a gas burner to form an ampule.

The quartz ampule thus obtained was placed in a cradle type electric furnace and the temperature was slowly elevated to 40020 C. and kept at that temperature for 24 hours. Thereafter, the temperature was again slowly elevated to 800° C. and kept at that temperature for 24 hours. During the heating for melting, the quartz ampule was rocked once for every 30 minutes in order to render the molten liquid uniform. Then, while keeping rocking the temperature was lowered slowly to 550° C., at which temperature rocking was discontinued. After standing for 1 hour, the amplule was taken out from the furnace and cooled in the air to obtain a glass material.

Figure 2:
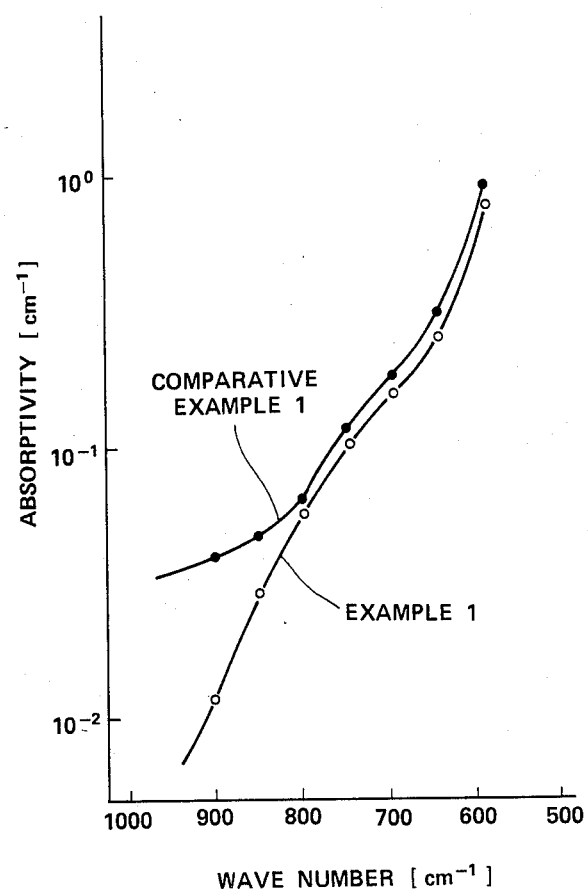
FIG. 2 is a graph showing dependency of the absorptivity of the glass materials prepared in example 1 and that of comparative example 1 on the wave number.

The glass material thus obtained was subjected to parallel polishing to give rise to glass sheets of various thickness between from 0.5 to 20 mm. The infrared transmission spectrum was measured and the absorptivity at the wave number of 900 to 600 $cm^{-1}$ was obtained. As shown in FIG. 2, the absorptivity decreased monotonously along with the increase in the wave number.

EXAMPLE 2

An ingot of Te of a purity of 6N and that of Se of the same purity, each together with 100 ppm of Mg, were introduced in separate quartz ampules, which then were sealed under reduced pressure of $10^{-5}$ Torr. The ampule were heated for melting in the same manner as in Example 1 to obtain solid solutions of Te-Mg and Se-Mg. Each of the solid solutions was distilled in the same manner as in Example 1. As a result, there remained in the left chamber 2 of the distillation purifying apparatus as shown in FIG. 1 plate yellowish white powders in the case where Te was used as a starting material and pale orange powders in the case where Se was used as a starting material after distillation operation. X ray diffraction analysis on the residue after distillation of Te indicated that the residue consisted of $MgO.2TeO_2$. On the other hand, upon XMA analysis on the residue after distillation of Se, strong X ray characteristic to Mg was detected and it was confirmed that the concentration ratio of Se to Mg was about 1:3, thus indicating that the main component of the reside is Mg.

Using the Te and Se thus obtained and ingots of Ge and Tl each of a purity of 6N the glass material having the same composition as in Example 1 was produced according to the same procedures as in Example 1.

The glass material thus obtained was subjected to parellel polishing to give rise to glass sheets of various thickness between from 0.5 to 20 mm. The infrared transmission spectrum was measured and the absorptivity at a wave number of 900 to 600 $cm^{-1}$ was obtained. Similarly to the glass material in Example 1, the absorptivity of the above glass material decreased monotonously along with the increase in the wave number.

In the distillation purifying apparatus as shown in FIG. 1, the solid solution is designated at reference numeral 5 and the resultant distillate is disignated at reference numeral 6. Also, the distillation purifyilng apparatus employed in the above described Examples 1 and 2 generally comprises, the left chamber 2, the right chamber 4, the inlet conduit 7 from which dry argon gas is introduced into the left chamber 2, an outlet conduit 9 from which argon gas is exhausted to the exterior, a connecting passage 8 for communication between the left and right chambers, heaters 1 for heating the left chamber 2 and heaters 3 for heating the right chamber 4. This distillation purifying apparatus is not limited to the illustrated apparatus as shown in FIG. 1 and any modifications may be employed in order to achieve the object of the present invention.

COMPARATIVE EXAMPLE 1

An ingot of Te of a purity of 6N and that of Se of the same purity, each together with 100 ppm of Al, were introduced in separate quartz ampules, which then were sealed under reduced pressure of $10^{-5}$ Torr. The ampule were heated for melting in the same manner as in Example 1 to obtain solid solutions of Te-Al and Se-Al, but these solid solutions were not followed by the specific distillation as described at the above EXAMPLES. Using the solid solutions thus obtained and ingots of Ge and Tl each of a purity of 6N the glass material having the same composition as in Example 1 was produced according to the same procedures as in Example 1.

The infrared transmission spectrum was measured and the absorptivity at a wave number of 900 to 600 $cm^{-1}$ was obtained in the same manner in Example 1. As shown in FIG. 2, the absorptivity of the above glass material was higher than that of the glass material obtained in Example 1 over the whole wave number range of 900 to 600 $cm^{-1}$ and the rate of decrease in the absorptivity in accordance with increase in the wave number became dull at a wave number of 800 $cm^{-1}$ or more.

COMPARATIVE EXAMPLE 2

An ingot of Te of a purity of 6N and that of Se of the same purity, each together with 100 ppm of Mg, were introduced in separate quartz ampules, which then were sealed under reduced pressure of $10^{-5}$ Torr. The ampule were heated for melting in the same manner as in Example 1 to obtain solid solutions of Te-Mg and Se-Mg, but, of course, these solid solutions were not followed by the specific distillation as described at the above EXAMPLES. Using the solid solutions thus obtained and ingots of Ge and Tl each of a purity of 6N the glass material having the same composition as in Example 1 was produced according to the same procedures as in Example 1.

The infrared transmission spectrum was measured and the absorptivity at a wave number of 900 to 600 $cm^{-1}$ was obtained in the same manner in Example 1. As shown in FIG. 2, the absorptivity of the above glass material was higher than that of the glass material obtained in Example 1 over the whole wave number range of 900 to 600 $cm^{-1}$ and the rate of decrease in the absorptivity in accordance with increase in the wave number became dull at a wave number of 800 $cm^{-1}$ or more.

Although the invention has been described with preferred embodiments, it is to be understood that variations and modifications may be employed without departing from the concept of the invention as defined in the following claims.

What is claimed is:

1. A method of purifying starting materials for chalcogenide glass, comprising at least the steps of:

contacting a chalcogen starting material with a metal which is more susceptible to oxidation than the chalcogen starting material to allow the metal to react with any oxygen contained as an impurity in the chalcogen starting material at a temperature sufficient to form an oxide of the metal, and removing unreacted metal and the oxide of said metal from the chalcogen starting material by distillation purification.

2. The method as claimed in claim 1, wherein said chalcogen starting material is at least one element selected from the group consisting of Se and Te.

3. The method as claimed in claim 1, wherein said metal is at least one element selected from the group consisting of Al and Mg.

4. The method as claimed in claim 3, wherein the amount of said metal is from 1 to 1,000 ppm based on the weight of said chalcogen starting material.

5. A method as claimed in claim 1, comprising the steps of sealingly encapsulating said chalcogen starting material and said metal in an evacuated quartz ampule, heating the mixture until molten, and removing resulting metal ozide and the unreacted metal by distillation purification.

6. A method for purifying starting materials for making chalcogenide glass wherein the purification takes place in a distillation purification apparatus comprising a heatable first quartz chamber having an inlet conduit, a heatable second quartz chamber having an outlet conduit, and a connecting passage for communication between said first and second quartz chamber, comprising at least the steps of:
   (a) preparing an ingot of a chalcogen element and a metal with the metal being in the range from 1 to 1000 ppm with said metal being at least one element selected from the group consisting of Al and Mg,
   (b) encapsulating said ingot and metal in a quartz ampule under a pressure of no greater than $10^{-5}$ Torr,
   (c) heating said ampule to a temperature greater than the melting point of the chalcogen element about 12 hours for wherein a solution is formed,
   (d) introducing a solid solution of step (c) into said first quartz chamber,
   (e) introducing dry argon gas into the apparatus through said inlet conduit for purging the first quartz chamber, said argon gas being exhausted from the apparatus through said outlet conduit, and
   (f) heating said first quartz chamber to a first temperature greater than the melting point of said solid solution and heating said second quartz chamber to a second temperature less than said first temperature wherein said first temperature is sufficient to vaporize the chalcogen and said second temperature is sufficient to condense said chalcogen.

7. A method as claimed in claim 6, wherein said chalcogen element includes Te.

8. A method as claimed in claim 7, wherein said temperature at the step (c) is at about 850° C.

9. A method as claimed in claim 8, wherein said first and second temperatures in step (f) are at about 850° C. and about 550° C., respectively.

10. A method as claimed in claim 6, wherein said chalcogen includes Se.

11. A method as claimed in claim 10, wherein said temperature in step (c) is about 750° C.

12. A method as claimed in claim 11, wherein said first and second temperatures in step (f) are at about 700° C. and about 330° C., respectively.

* * * * *

UNITED STATES PATENT AND TRADEMARK OFFICE
CERTIFICATE OF CORRECTION

PATENT NO. : 4,801,442

DATED : January 31, 1989

INVENTOR(S) : Junji Nishii et al.

It is certified that error appears in the above-identified patent and that said Letters Patent is hereby corrected as shown below:

Cover page, item [54], "CHALCHOGENIDE" should read --CHALCOGENIDE--.

Cover page, under FOREIGN PATENT DOCUMENTS, Patent No. 0268653, "923/508" should read --423/508--.

Column 1, line 25, "Katsuyma" should read --Katsuyama--.

Column 1, line 26, "Ge-Se-Te-Sb" should read --Ge-Se-Te--.

Column 1, line 29, "(1970)" should read --(1979)--.

Column 4, line 14, "40020 C." should read --400° C.--.

Column 4, line 44, "plate" should read --pale--.

Column 4, line 49, "$MgO.2TeO_2$" should read --$MgO \cdot 2TeO_2$--.

Column 5, line 2, "purifyilng" should read --purifying--.

Column 6, line 23, "ozide" should read --oxide--.

Column 6, line 23, before "unreacted", delete "the".

Column 6, line 30, "chamber" should read --chambers--.

Column 6, line 41, after "12 hours" delete "for".

Signed and Sealed this

Second Day of January, 1990

Attest:

JEFFREY M. SAMUELS

Attesting Officer    Acting Commissioner of Patents and Trademarks